US009618061B2

(12) United States Patent
Kobayashi et al.

(10) Patent No.: US 9,618,061 B2
(45) Date of Patent: Apr. 11, 2017

(54) CLUTCH MECHANISM

(71) Applicant: NAMIKI SEIMITSU HOUSEKI KABUSHIKI KAISHA, Tokyo (JP)

(72) Inventors: Yasuyuki Kobayashi, Kuroishi (JP); Kinya Odagiri, Kuroishi (JP)

(73) Assignee: NAMIKI SEIMITSU HOUSEKI KABUSHIKI KAISHA, Tokyo (JP)

(*) Notice: Subject to any disclaimer, the term of this patent is extended or adjusted under 35 U.S.C. 154(b) by 154 days.

(21) Appl. No.: 14/383,504

(22) PCT Filed: Mar. 1, 2013

(86) PCT No.: PCT/JP2013/055671
§ 371 (c)(1),
(2) Date: Jan. 7, 2015

(87) PCT Pub. No.: WO2013/133162
PCT Pub. Date: Sep. 12, 2013

(65) Prior Publication Data
US 2015/0136556 A1 May 21, 2015

(30) Foreign Application Priority Data
Mar. 5, 2012 (JP) .................................. 2012-047922

(51) Int. Cl.
*F16D 43/02* (2006.01)
*F16D 41/066* (2006.01)
(Continued)

(52) U.S. Cl.
CPC ........... *F16D 43/02* (2013.01); *F16D 41/066* (2013.01); *F16D 41/105* (2013.01); *F16D 2041/0605* (2013.01)

(58) Field of Classification Search
CPC .... F16D 41/066; F16D 41/088; F16D 41/105; F16D 43/02; F16D 2041/0605
(Continued)

(56) References Cited

U.S. PATENT DOCUMENTS 2,209,122 A * 7/1940 Houplain ................. B62D 3/02
192/223.2
3,243,023 A * 3/1966 Boyden ..................... F16B 1/04
192/223.2
(Continued)

FOREIGN PATENT DOCUMENTS

DE 19920508 A1 * 11/2000 ........... F16D 41/066
JP EP 0884494 A1 * 12/1998 ............. B60Q 1/245
(Continued)

OTHER PUBLICATIONS

International Search Report; PCT/JP2013/055671; Mar. 26, 2013.

*Primary Examiner* — Richard Lorence
(74) *Attorney, Agent, or Firm* — Studebaker & Brackett PC

(57) ABSTRACT

There is provided a clutch mechanism that allows easy downsizing and produces favorable productivity. Output rotator has on the outer circumferential surface thereof cam surfaces and configured to gradually reduce the space from a housing chamber inner circumferential surface toward one side and recesses adjacent to the one side of the cam surfaces. Input rotator has pressure transmission portions that are fitted with circumferential play to the recesses and are protruded from the insides of the recesses in a centrifugal direction. Engagement pieces are disposed in contact with the cam surfaces and the housing chamber inner circumferential surface. When the input rotator rotates toward the other side relative to the one side, the pressure transmission portions abut against the engagement pieces and then abut
(Continued)

against circumferential end surfaces in the recesses to press and move the output rotator.

5 Claims, 5 Drawing Sheets

(51) Int. Cl.
  *F16D 41/10* (2006.01)
  *F16D 41/06* (2006.01)
(58) Field of Classification Search
  USPC .................................................. 192/223.2
  See application file for complete search history.

(56) References Cited

U.S. PATENT DOCUMENTS

| | | | | |
|---|---|---|---|---|
| 5,105,924 | A * | 4/1992 | Carlson | B63H 25/10 |
| | | | | 114/144 R |
| 7,048,107 | B1 * | 5/2006 | Geis | F16D 41/105 |
| | | | | 192/223.2 |
| 9,316,288 | B2 * | 4/2016 | Kobayashi | F16H 1/2863 |
| 2008/0078647 | A1 * | 4/2008 | Watanabe | F16D 41/067 |
| | | | | 192/41 A |
| 2015/0126326 | A1 * | 5/2015 | Kobayashi | F16H 1/46 |
| | | | | 475/331 |

FOREIGN PATENT DOCUMENTS

| | | | |
|---|---|---|---|
| JP | 2002-301956 A | 10/2002 |
| JP | 2004-176863 A | 6/2004 |
| JP | 2005-325908 A | 11/2005 |
| JP | 2007-192314 A | 8/2007 |

* cited by examiner

CLUTCH MECHANISM

TECHNICAL FIELD

The present invention relates to a clutch mechanism that transmits and shuts off a rotational force between an input rotator and an output rotator, more specifically, to a clutch mechanism suitable for a small-sized device such as a tape feeder.

BACKGROUND ART

When being energized, a motor can generate a predetermined torque at a rotational shaft to rotate the shaft, and also controlling the position of the rotation. However, when no power is supplied, the motor cannot control the rotation of the rotational shaft, and thus if the rotational shaft is subject to an external torque, the rotational shaft easily rotates. Thus, there is a need for a device whose stop position is to be fixed accurately even when no power is supplied such as a tape feeder unit to include a rotational position holding device such as an electric-powered brake device and an inverse input clutch.

For example, there is an electric-powered brake device as described below. At the electric-powered brake device, when being not energized, a brake pad is pressed against a rotational member by a biasing force of a spring to restrain the rotational member. When being energized, the restrained state is canceled out by an electromagnetic force of an electric magnet against the biasing force.

In addition, the inverse input clutch transmits a rotational force of an input-side member to an output-side member, by the use of a lock mechanism that engages an engagement piece into a wedge-shaped portion between a stationary member and the output-side member and disengages the engagement piece from the wedge-shaped portion, as in the invention described in Patent Document 1, for example. The inverse input clutch locks the output-side member when the output-side member is subject to an external rotational force.

However, the former conventional art (electric-powered brake device) constantly consumes electric power while the brake is released besides during motor operations, thereby resulting in decrease of energy efficiency. Further, the addition of the brake device makes the entire device larger in size.

The latter conventional technique (inverse input clutch) is complicated in structure because a rotational force is transmitted by engagement of a pin (3b1) with a pin hole (2b3) into which the pin is inserted and a cylindrical portion (3c) for pressing and moving an engagement piece (20) is provided separately from the pin, and the like (refer to Patent Document 1, FIGS. 16 to 18). It is thus difficult to reduce the device size of the inverse input clutch to an extent that the internal diameter of a housing chamber becomes about 12 mm, for example. In addition, the conventional inverse input clutch needs to have a relatively smaller angle of the wedge-shaped portion of 3 to 4.5° (refer to Patent Document 1, paragraph 0012). Thus, if the spacing between two engagement pieces (20) is widened to reduce the diameter of the engagement pieces, for example, the angle becomes larger and the engagement pieces do not come to engage into the wedge-shaped portion. This also constitutes a hindrance to downsizing the engagement pieces and the entire structure.

CITATION LIST

Patent Literature

Patent Document 1: JP-A 2002-122158

SUMMARY OF INVENTION

Problems to be Solved by the Invention

The present invention is devised in light of the foregoing conventional circumstances. An object of the present invention is to provide a clutch mechanism as described below. As a matter of course, the clutch mechanism is capable of transmitting a rotational force from the input side to the output side, and suppressing rotation of the output side if the output side is subject to an external rotational force. The clutch mechanism also is energy-saving, allows easy downsizing, and has good productivity, favorable operability, and excellent durability.

Solutions to the Problems

Means for solving the above problems includes: a housing chamber having a cylindrical space; an output rotator coaxially housed in the housing chamber; an input rotator coaxially provided with the output rotator; an engagement piece provided between an inner circumferential surface of the housing chamber and an outer circumferential surface of the output rotator; and a biasing member configured to bias the engagement piece toward one side of the circumferential direction. The output rotator has on the outer circumferential surface thereof a cam surface configured to gradually reduce the space from the inner circumferential surface of the housing chamber toward the one side and a recess adjacent to the one side of the cam surface, the input rotator has a pressure transmission portion fitted with circumferential play to the recess and is protruded from the inside of the recess in a centrifugal direction, the engagement piece is disposed in contact with the cam surface and the inner circumferential surface of the housing chamber, and when the input rotator rotates toward the other side relative to the one side, the pressure transmission portion abuts against the engagement piece and then abuts against a circumferential end surface in the recess to press and move the output rotator.

Effects of the Invention

The present invention is configured in such a manner as described above. It will be appreciated that the present invention is capable of transmitting a rotational force from the input side to the output side, and suppressing rotation of the output side if the output side is subject to an external rotational force. The present invention does not need a power source and thus is energy-saving. Moreover, the present invention facilitates downsizing because the engagement pieces can be disposed in a more appropriate manner and the like, and has good productivity, favorable operability, and excellent durability.

DESCRIPTION OF EMBODIMENTS

Figure 1:
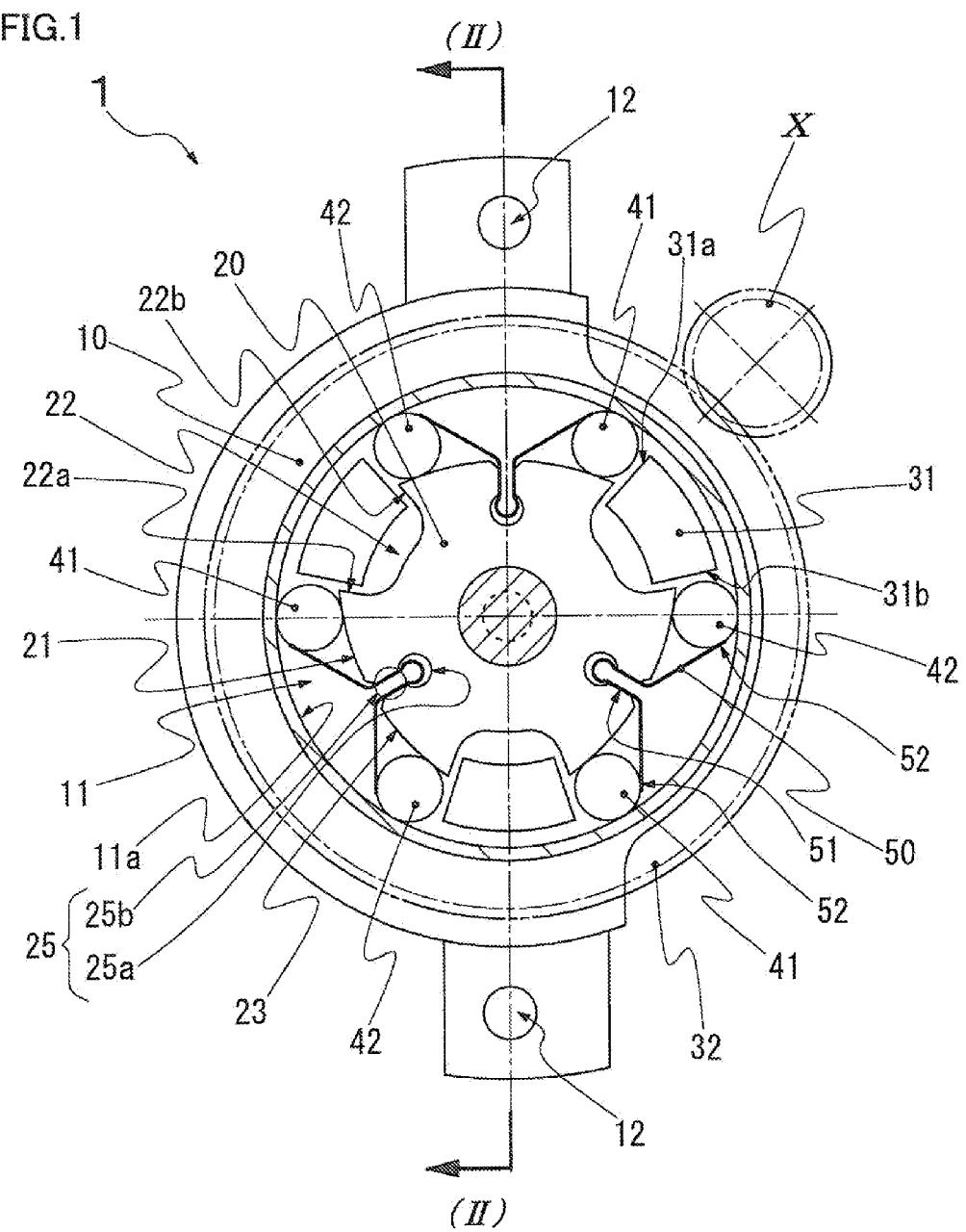
FIG. 1 is a structure diagram illustrating one example of a clutch mechanism according to the present invention.

A first embodiment according to the present invention includes: a housing chamber having a cylindrical space; an output rotator coaxially housed in the housing chamber; an input rotator coaxially provided with the output rotator; an engagement piece provided between an inner circumferential surface of the housing chamber and an outer circumferential surface of the output rotator; and a biasing member configured to bias the engagement piece toward one side of the circumferential direction. The output rotator has on the outer circumferential surface thereof a cam surface configured to gradually reduce the space from the inner circumferential surface of the housing chamber toward the one side and a recess adjacent to the one side of the cam surface, the input rotator has a pressure transmission portion fitted with circumferential play to the recess and is protruded from the inside of the recess in a centrifugal direction, the engagement piece is disposed in contact with the cam surface and the inner circumferential surface of the housing chamber, and when the input rotator rotates toward the other side relative to the one side, the pressure transmission portion abuts against the engagement piece and then abuts against a circumferential end surface in the recess to press and move the output rotator.

According to this mode, if the output rotator is subject to an external rotational force toward the other side (inverse-direction side) relative to the one side, the engagement piece is strongly pressed against between the cam surface of the output rotator about to rotate toward the other side and the inner circumferential surface of the housing chamber. This hinders rotation of the output rotator in the other direction.

In addition, if the input rotator is subject to a rotational force toward the other side, the pressure transmission portion of the input rotator abuts against the engagement piece. This reduces friction between the engagement piece and the cam surface, and friction between the engagement piece and the inner circumferential surface of the housing chamber. Thereafter, the pressure transmission portion abuts against the circumferential end surface in the recess to press and move the output rotator. The output rotator thus rotates toward the other side smoothly.

In a second embodiment, as a specific example for realizing downsizing and improving productivity, the pressure transmission portion in the first embodiment has an abutment surface to abut against the circumferential end surface in the recess. Here, the abutment surface radially extends from the inside to outside of the recess.

In a third embodiment, the cam surface in the first or second embodiment is formed as a convex surface curved in the circumferential direction.

According to the embodiment, the cam surface is formed as a convex surface curved in the circumferential direction. This makes it possible to set as appropriate the angle formed by a tangent between the inner circumferential surface of the housing chamber and the engagement piece and a tangent between the engagement piece and the cam surface. Thus, by disposing the engagement piece near the deeper side of the wedge, the structure of the entire clutch mechanism can be downsized.

Specifically, as compared to the conventional inverse input clutch that needs to have a smaller angle at the wedge-shaped portion, the clutch mechanism of the present embodiment of the same size as the conventional one makes it possible to incorporate a larger engagement piece in the radial direction of the input and output shafts. Specifically, when comparing the clutch mechanism of the present embodiment with the conventional one using the engagement pieces of the same size, the present embodiment allows the entire clutch mechanism to be more downsized in the radial direction of the input and output shafts.

In a fourth embodiment, to improve operability of the engagement piece and obtain more favorable engagement and disengagement effects of the engagement piece, the engagement piece in the third embodiment is formed in a cylindrical or spherical shape and the cam surface is formed in an arc shape that has a radius larger than a value obtained by subtracting the diameter of the engagement piece from the radius of the inner circumferential surface of the housing chamber.

In a fifth embodiment, to obtain further favorable engagement and disengagement effects of the engagement piece, when the angle formed by the tangent between the inner circumferential surface of the housing chamber and the engagement piece and the tangent between the engagement piece and the cam surface in any of the first to fourth embodiments is designated as θ and either the coefficient of static friction between the inner circumferential surface of the housing chamber and the engagement piece or the coefficient of static friction between the engagement piece and the cam surface, which is smaller in value, is designated as μ, the relationship $\sin \theta/(\cos \theta+1) \le \mu$ holds.

In a sixth embodiment, the biasing member in any of the first to fifth embodiments includes a fixing portion fixed to the output rotator and a pressing portion extending from the fixing portion to press the engagement piece.

For example, when a single biasing member is provided between a pair of engagement pieces, an unintended force may act on the biasing member or the like because the engagement pieces abut against both the pressing surface and the receiving surface of the biasing member or the like. This may result in unstable transmission of the biasing force of the biasing member. According to a seventh embodiment, the fixing portion is fixed to the output rotator. This makes it possible to transmit the biasing force of the biasing member in a stable manner.

In a seventh embodiment according to any of the first to sixth embodiments, to deliver the same effects in any rotations toward one side and the other side, the engagement piece is provided in a pair, the biasing member is provided to bias the pair of engagement pieces toward the one side and the other side opposite to each other in the circumferential direction, the cam surface includes a plurality of sets of one cam surface configured to gradually reduce the space from the inner circumferential surface of the housing chamber toward the one side and the other cam surface configured to gradually reduce the space from the inner circumferential surface of the housing chamber toward the other side, the plurality of sets being disposed in the circumferential direction, the recess is adjacent to the one side of the one cam surface and adjacent to the other side of the other cam surface, one of the pair of engagement pieces is disposed in contact with the one cam surface and the inner circumferential surface of the housing chamber, and the other is disposed in contact with the other cam surface and the inner circumferential surface of the housing chamber, the pressure transmission portion is provided for each of the recesses, when the input rotator rotates toward the other side, the pressure transmission portion abuts against the one engagement piece and then abuts against a circumferential end surface of the other side in the recess to press and move the output rotator toward the other side, and when the input rotator rotates toward the one side, the pressure transmission portion abuts against the other engagement piece and then abuts against a circumferential end surface of the one side in the recess to press and move the output rotator toward the one side.

Some of the foregoing embodiments can be independent inventions not including some of the configurations of embodiments described earlier.

Specifically, one of the independent inventions includes: a housing chamber having a cylindrical space; an output rotator coaxially housed in the housing chamber; an input rotator coaxially provided with the output rotator; an engagement piece provided between an inner circumferential surface of the housing chamber and an outer circumferential surface of the output rotator; and a biasing member biasing the engagement piece toward one side of the circumferential direction, wherein a cam surface is formed on the outer circumferential surface of the output rotator to gradually reduce the space from the inner circumferential surface of the housing chamber toward the one side, and when the input rotator rotates toward the other side relative to the one side, the input rotator abuts against the engagement piece and then abuts against the output rotator to press and move the output rotator, and the cam surface is formed in a convex surface curved in the circumferential direction.

According to the independent invention, the cam surface is formed in a convex surface curved in the circumferential direction. This makes it possible to set as appropriate the angle formed by the tangent between the inner circumferential surface of the housing chamber and the engagement piece and the tangent between the engagement piece and the cam surface. As a result, the engagement piece easily engages into the wedge-shaped portion formed by the inner circumferential surface of the housing chamber and the cam surface. Thus, the device can be downsized by disposing the engagement piece near the deeper side of the wedge-shaped portion.

Next, particularly preferred examples of the foregoing embodiments will be described in detail with reference to the drawings.

Examples

Figure 2:
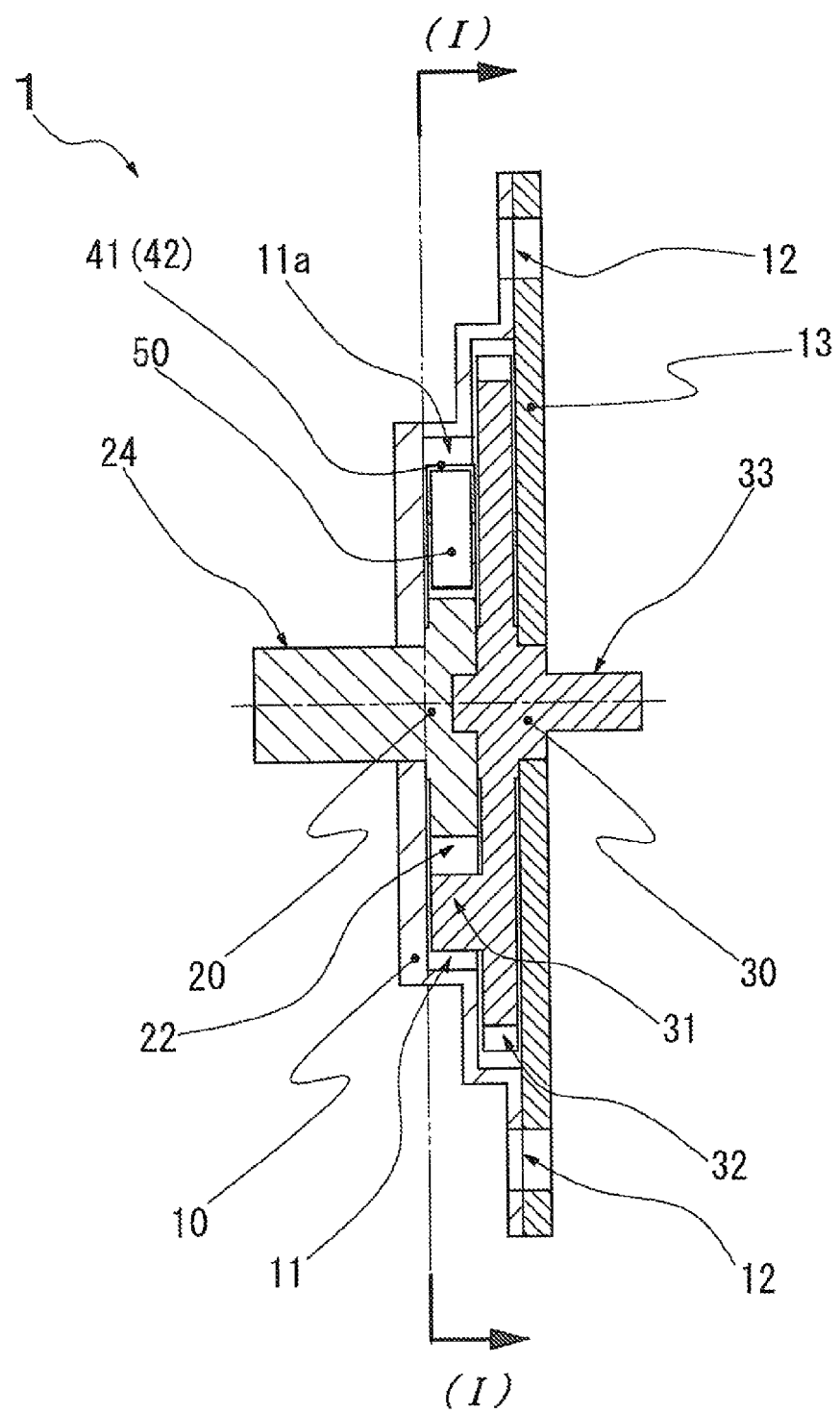
FIG. 2 is a side sectional view of a structure of the clutch mechanism.

A clutch mechanism 1 includes a fixed member 10, an output rotator 20, an input rotator 30, a pair of engagement pieces 41, 42, and a biasing member 50, as illustrated in FIG. 1 as a sectional view of FIG. 2 taken along line (I)-(I) of FIG. 2 and FIG. 2 as a side sectional view of the clutch mechanism 1 as seen from the direction of line (II)-(II) of FIG. 1. The fixed member 10 forms a housing chamber 11 having a cylindrical space. The output rotator 20 is coaxially housed in the housing chamber 11. The input rotator 30 is coaxially provided with the output rotator 20. The pair of engagement pieces 41, 42 is provided between a housing chamber inner circumferential surface 11a and an outer circumferential surface of the output rotator 20. The biasing member 50 biases one engagement piece 41 toward one side of the circumferential direction (clockwise direction in FIG. 1). The biasing member 50 further biases the other engagement piece 42 toward the other side of the circumferential direction (counterclockwise direction in FIG. 1). When the input rotator 30 is subject to a rotational force from a gear x engaging the outer circumference of the input rotator 30, the clutch mechanism 1 transmits the rotational force to the output rotator 20 to rotate the output rotator 20. When the output rotator 20 is subject to an external rotational force, the clutch mechanism 1 locks the output rotator 20 so as to be incapable of rotation.

The fixed member 10 has therein the housing chamber 11 for housing the output rotator 20, the engagement pieces 41, 42, and the biasing member 50. The housing chamber 11 provides an almost cylindrical space surrounded by the inner circumferential surface 11a. The inner circumferential surface 11a is a cylindrical inner circumferential smooth curved-surface.

The fixed member 10 is fixed in a manner incapable of rotation to a stationary section not illustrated (for example, a support substrate for a tape feeder or the like) across a fixing plate 13 illustrated in FIG. 2. The fixed member 10 may be designed to be fixed to the stationary section without disposing the fixing plate 13. Referring to FIG. 1, reference numeral 12 denotes retainer holes for fixing the fixed member 10 to the stationary section.

The output rotator 20 is an almost disc-shaped member concentrically disposed in the housing chamber 11, and has a central portion supported rotatably relative to the fixed member 10. A portion of the output rotator 20 at one end side of the axial direction (right end side in FIG. 2) is rotatably fitted to the fixed member 10. The output rotator 20 has at the central portion thereof an integral output shaft 24 exposed to the outside.

A plurality of sets (three sets in the illustrated example) of one cam surface 21, a recess 22, the other cam surface 23, and a lock portion 25 is disposed at a predetermined angle (at regular intervals) at an outer circumferential portion of the output rotator 20. The one cam surface 21 gradually reduces the space from the inner circumferential surface 11a of the housing chamber 11 toward the one side of the circumferential direction (clockwise direction in FIG. 1). The recess 22 is adjacent to one side of the one cam surface 21. The other cam surface 23 gradually reduces the space from the inner circumferential surface 11a of the housing chamber 11 toward the other side (counterclockwise direction in FIG. 1) positioned opposite to the one cam surface 21. The lock portion 25 locks the biasing member 50.

The cam surface 21 and the cam surface 23 are provided symmetrically. The cam surfaces 21, 23 are formed in a convex surface curved in the circumferential direction. More specifically, the cam surfaces 21, 23 are each formed in an arc shape that has a radius larger than a value obtained by subtracting the diameter of the engagement pieces 41, 42 from the radius of the housing chamber inner circumferential surface 11a. The cam surfaces 21, 23 are each provided such that the central position of the arc is shifted from the central position of the output rotator 20.

The recess 22 is recessed in a centripetal direction from the outer circumferential surface of the output rotator 20 and penetrates through the output rotator 20 in the axial direction of the output rotator 20. The recess 22 has at both circumferential ends thereof pressed surfaces 22a, 22b to be pressed by a pressure transmission portion 31 of the input rotator 30 described later. The pressed surfaces 22a, 22b are each formed as a flat surface extended in the radial direction. One pressed surface 22a crosses the one cam surface 21. The other pressed surface 22b crosses the other cam surface 23.

The lock portion 25 is a recess disposed between the one curved cam surface 21 and the other cam surface 23 positioned opposite to each other at an outer circumferential portion of the output rotator 20. More specifically, the lock portion 25 includes an insertion space portion 25a into which the biasing member 50 is inserted and a bottom-side space portion 25b formed at the deeper side (bottom side) than the insertion portion.

The insertion space portion 25a forms a space with a certain width. The bottom-side space portion 25b forms a space that has a circumferential width larger than the insertion space portion 25a. The insertion space portion 25a and the bottom-side space portion 25b are configured to fix the base end-side portion of the inserted biasing member 50 so as not to be easily extracted.

The input rotator 30 is an almost disc-shaped member axially aligned with the output rotator 20. The input rotator 30 has at an outer circumferential portion thereof a gear portion 32 to engage with the gear x at the drive source side.

The input rotator 30 has a central portion at one end side of the axial direction (the right end side in FIG. 2) fitted to the output rotator 20 such that the input rotator 30 rotates bi-directionally. The input rotator 30 also has a shaft portion 33 protruded from the other end side of the axial direction. The shaft portion 33 may be used as an input shaft for inputting a rotational force in place of the gear portion 32, or as a support shaft for rotating and supporting the input rotator 30 in a more stable manner.

In addition, the input rotator 30 has at a side surface of the output rotator 20 side a plurality of (three in the illustrated example) pressure transmission portions 31 protruded at predetermined circumferential intervals in correspondence with the recesses 22.

The pressure transmission portions 31 are fitted with circumferential play to the recesses 22 of the output rotator 20. The pressure transmission portions 31 are formed in an almost fan shape protruded from the insides of the recesses 22 in a centrifugal direction. The pressure transmission portions 31 each have abutment surfaces 31a, 31b at both circumferential ends thereof. The abutment surfaces 31a, 31b are capable of abutment against the pressed surfaces 22a, 22b of the output rotator 20 and are also capable of abutment against the engagement pieces 41, 42.

Each of the abutment surfaces 31a, 31b radially extends from the inside to outside of the recess 22. One abutment surface 31a is formed as a flat surface almost parallel to the one pressed surface 22a of the recess 22. The other abutment surface 31b is formed as a flat surface almost parallel to the other pressed surface 22b of the recess 22. Circumferential width between the two abutment surfaces 31a, 31b is made slightly smaller than the circumferential width between the pressed surfaces 22a, 22b of the output rotator 20.

The engagement pieces 41, 42 are each formed in a cylindrical or sphere shape (cylindrical shape in the illustrated example) and are provided in pair in correspondence with the one and other cam surfaces 21, 23.

Of the paired engagement pieces 41, 42, the one engagement piece 41 is disposed in contact with the one cam surface 21 and the housing chamber inner circumferential surface 11a. The other engagement piece 42 is disposed in contact with the other cam surface 23 and the housing chamber inner circumferential surface 11a. While the respective engagement pieces 41, 42 are pressed against the biasing member 50 described later, the engagement pieces 41, 42 remain still at positions slightly protruded toward the inside of the recess 22 as compared to the pressed surfaces 22a, 22b of the recess 22.

The biasing member 50 is formed by bending and shaping an elongated flat plate-like spring member in an almost Y shape. The biasing member 50 includes: a fixing portion 51 and is retained and fixed to the lock portion 25 of the output rotator 20; and two pressing portions 52, 52 that are branched and extended in two from the fixing portion 51. The biasing member 50 uses the pressing portions 52, 52 to bias the pair of engagement pieces 41, 42 so as to be separated from each other.

The fixing portion 51 includes: an almost cylindrical portion corresponding to the bottom-side space portion 25b of the lock portion 25 on the outer circumference of the output rotator 20; and a narrow parallel plate-like portion corresponding to the insertion space portion 25a of the lock portion 25.

Each of the pressing portions 52 is extended from the fixing portion 51 and is inclined toward the cam surface 21 side (or the cam surface 23 side). The inclined surface of the pressing portion 52 abuts against the outer circumferential surface of the corresponding engagement piece 41 (or engagement piece 42).

Next, characteristic effects of the thus configured clutch mechanism 1 will be described in detail.

First, when none of the output rotator 20 and the input rotator 30 is subject to a rotational force (refer to FIG. 1), the engagement pieces 41, 42 are pressed by the biasing member 50, and are pressed against the wedge-shaped portions between the cam surfaces 21, 23 and the inner circumferential surface 11a of the housing chamber 11.

Therefore, the output rotator 20 is kept still so as not to rotate in one direction (clockwise direction in FIG. 1) or the other direction (counterclockwise direction in FIG. 1).

In the foregoing state, if the output rotator 20 is subject to an external rotational force in the one direction (clockwise direction in FIG. 1), for example, the other engagement piece 42 is strongly pressed and engaged between the other cam surface 23 of the output rotator 20 about to rotate in the one direction and the housing chamber inner circumferential surface 11a. This hinders rotation of the output rotator 20 in the one direction.

Similarly, if the output rotator 20 is subject to an external rotational force in the other direction (counterclockwise direction in FIG. 1), for example, the one engagement piece 41 is strongly pressed and engaged between the one cam surface 21 of the output rotator 20 about to rotate in the other direction and the housing chamber inner circumferential surface 11a. This hinders rotation of the output rotator 20 in the other direction.

Figure 3:
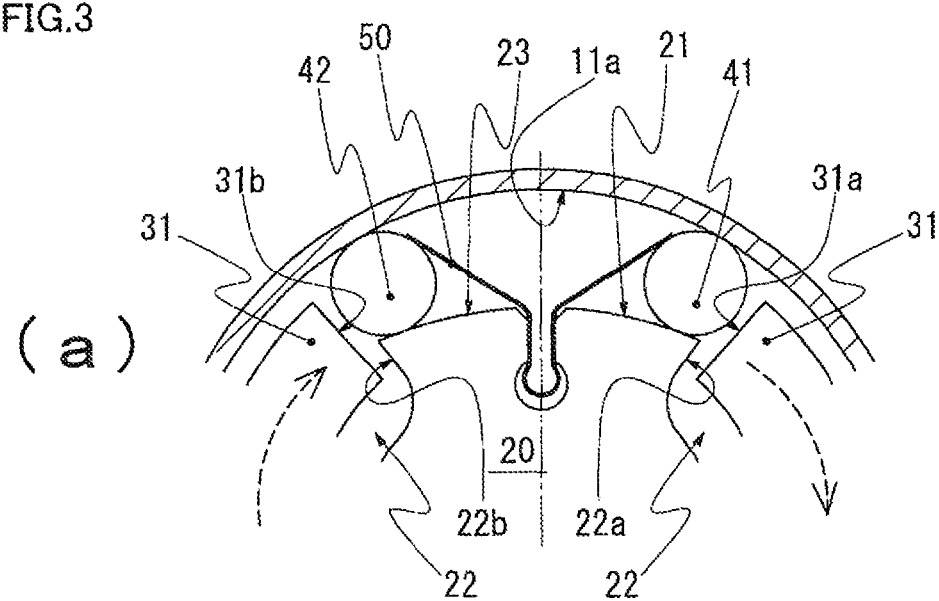
FIG. 3 is an explanatory diagram describing operations of the clutch mechanism.
Figure 3:
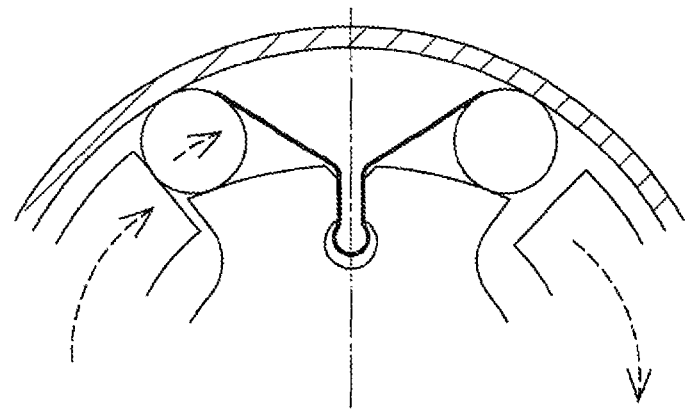
Figure 3:
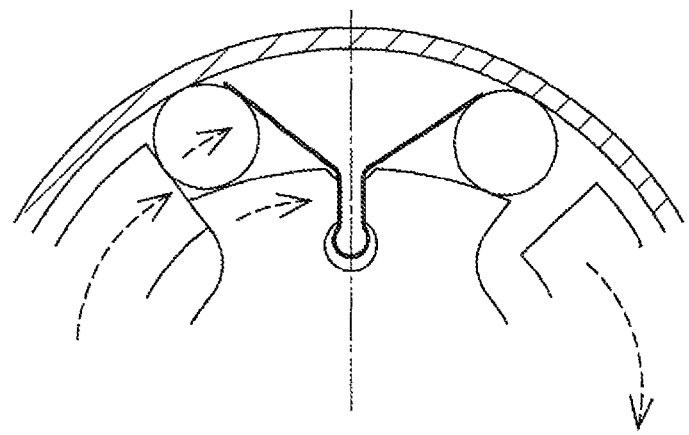

In addition, as illustrated in FIG. 3, for example, if the input rotator 30 is subject to a rotational force in the one direction (FIG. 3A), the pressure transmission portion 31 of the input rotator 30 first abuts against the one engagement piece 42 (FIG. 3B). This reduces the friction between the engagement piece 42 and the cam surface 23 and the friction between the engagement piece 42 and the housing chamber inner circumferential surface 11a. Then, the pressure transmission portion 31 abuts against the pressed surface 22b in the recess 22 to press and move the output rotator 20 (FIG. 3C). Thus, the output rotator 20 rotates smoothly in the other direction.

In addition, if the input rotator 30 is subject to a rotational force in the one direction, the pressure transmission portion 31 of the input rotator 30 first abuts against the other engagement piece 41, although not illustrated. This reduces the friction between the engagement piece 41 and the cam surface 21 and the friction between the engagement piece 42 and the housing chamber inner circumferential surface 11a.

Then, the pressure transmission portion 31 abuts against the pressed surface 22a in the recess 22 to press and move the output rotator 20. Thus, the output rotator 20 rotates smoothly in the other direction.

The engagement and disengagement operations of the engagement pieces 41, 42 described above can be favorably obtained by suitably setting the angle between the cam surfaces 21, 23 and the housing chamber inner circumferential surface 11a. In the example, therefore, when it is assumed that the angle formed by the tangent between the housing chamber inner circumferential surface 11a and the engagement pieces 41, 42 and the tangent between the engagement pieces 41, 42 and the cam surfaces 21, 23 is designated as θ and either the coefficient of static friction between the housing chamber inner circumferential surface 11a and the engagement pieces 41, 42 or the coefficient of static friction between the engagement pieces 41, 42 and the cam surfaces 21, 23, which is smaller in value, is designated as μ, the relationship sin θ/(cos θ+1)≤μ holds. The foregoing relationship will be described below in detail.

The following description will be given with the use of the other engagement piece 42 and the other cam surface 23. As a matter of course, the same operation can be obtained in the case of using the one engagement piece 41 and the one cam surface 21 symmetric with respect to the former case.

Figure 4:
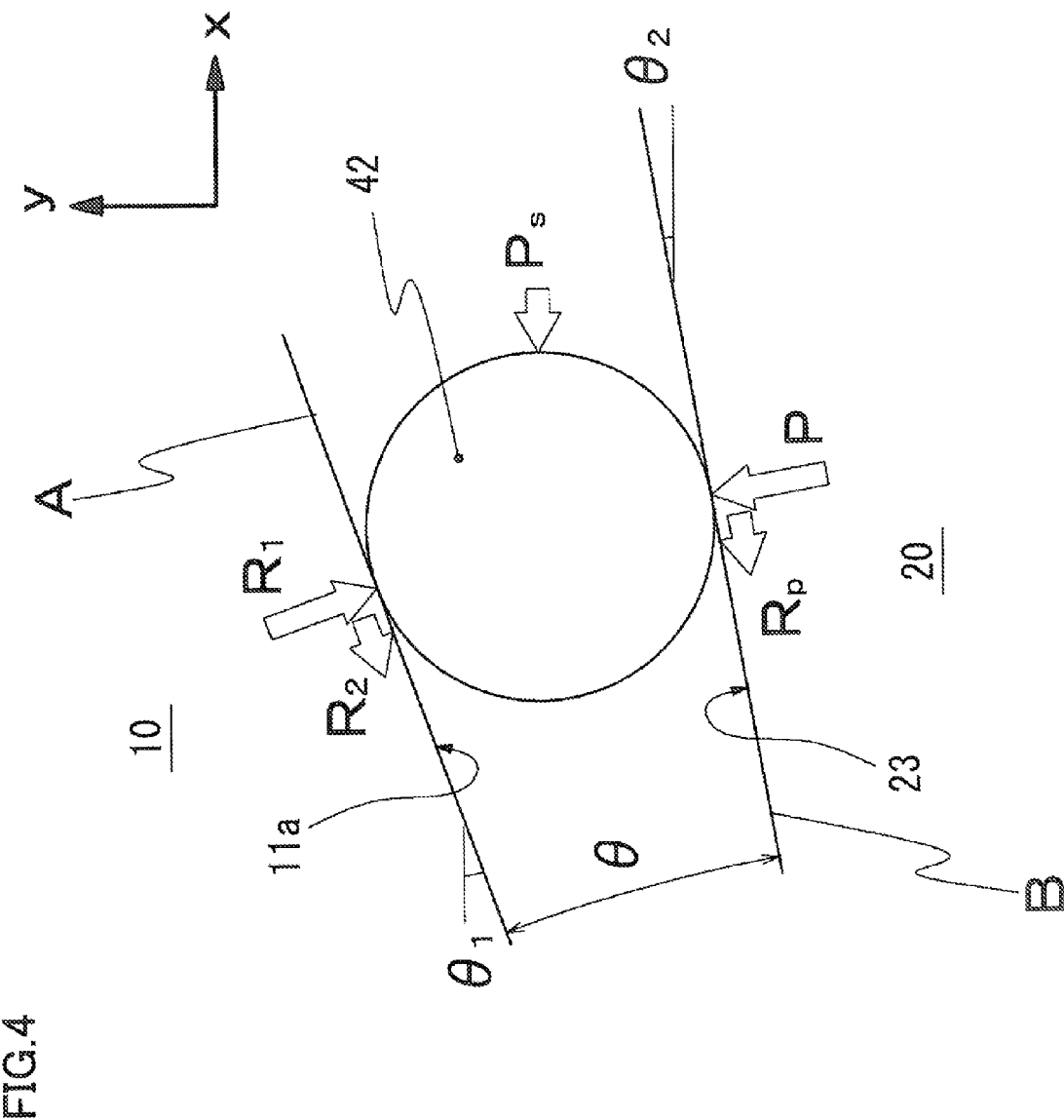
FIG. 4 is a schematic diagram illustrating the relationship among an inner circumferential surface of a housing chamber, an engagement piece, and a cam surface.
Figure 5:
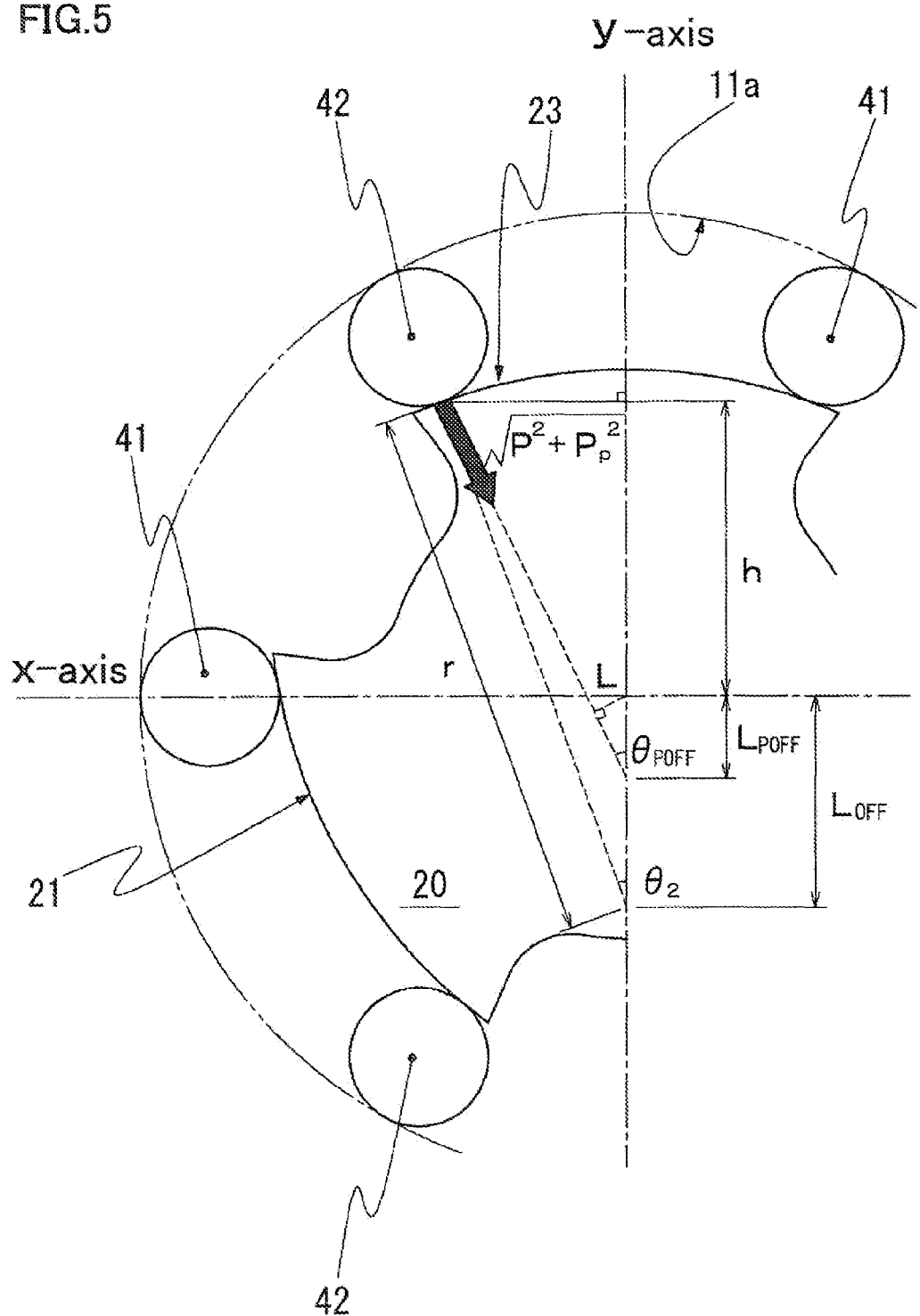
FIG. 5 is a schematic diagram illustrating the relationship between the engagement pieces and an output rotator.

FIGS. 4 and 5 are schematic diagrams illustrating the relationship among the housing chamber inner circumferential surface 11a, the engagement piece 42, and the cam surface 23.

In FIG. 5, y axis is an intermediate line between the right and left engagement pieces 41, 42 as seen such that the engagement piece 42 for locking rightward rotation of the output rotator 20 is disposed at the left side and the engagement piece 41 for locking leftward rotation of the output rotator 20 is disposed at the right side. The y axis is also a straight line passing through central point O of the output rotator 20. An x axis is a straight line orthogonal to the y axis and passes through central point O of the output rotator 20.

Symbols in FIGS. 4 and 5 and equations indicate the following:

A: Tangent between the engagement piece 42 and the housing chamber inner circumferential surface 11a (refer to FIG. 4)

B: Tangent between the engagement piece 42 and the cam surface 23 h: Height from the x axis to the contact point between the engagement piece 42 and the output rotator 20 (refer to FIG. 5)

L: Moment arm (shortest distance between the center O of the output rotator 20 and line of action of load applied on the output rotator 20 from the engagement piece 42)

$L_{POFF}$: Distance from the center O of the output rotator 20 to point of intersection between the line of action of load applied on the output rotator 20 from the engagement piece 42 and the y axis $L_{OFF}$: Distance from the center O of the output rotator 20 to point of intersection between the normal to the contact point of the engagement piece 42 and the y axis P: Load applied on the engagement piece 42 from the cam surface 23 (refer to FIG. 4)

$P_s$: Load applied on the engagement piece 42 from the biasing member 50

$R_1$: Load applied on the engagement piece 42 from the housing chamber inner circumferential surface 11a $R_2$: Force of friction between the housing chamber inner circumferential surface 11a and the engagement piece 42

$R_p$: Force of friction between the engagement piece 42 and the cam surface 23 r: Distance from the contact point between the engagement piece 42 and the output rotator 20 to the point of intersection between the normal to the contact point and the y axis (refer to FIG. 5)

θ: Angle between tangent A between the engagement piece 42 and the housing chamber inner circumferential surface 11a and tangent B between the engagement piece 42 and the other cam surface 23 (refer to FIG. 4)

$θ_1$: Angle formed by the tangent A between the engagement piece 42 and the housing chamber inner circumferential surface 11a and the x axis $θ_2$: Angle formed by the tangent B between the engagement piece 42 and the other cam surface 23 and the x axis $θ_{POFF}$: Angle formed by the line of action of load applied on the output rotator 20 from the engagement piece 42 and the y axis (refer to FIG. 5)

α: Constant

μ: Either coefficient of static friction between the housing chamber inner circumferential surface 11a and the engagement piece 42 or coefficient of static friction between the engagement piece 42 and the cam surface 23, which is smaller in value First, static balance of forces around the engagement piece 42 generating a holding torque will be discussed. It is assumed as a prerequisite that the engagement piece 42 slides without rotation and is subject to a constant load from the biasing member 50, and friction between the biasing member 50 and the engagement piece 42 is ignorable. It is be also assumed that the housing chamber inner circumferential surface 11a, the cam surface 23, and the engagement piece 42 do not elastically deform.

Since the engagement piece 42 does not rotate and friction of the engagement piece 42 at its portion in contact with the biasing member 50 is ignorable, the following equation can be formulated from balance of moment at the center of the engagement piece 42:

$$R_p = R_2 \quad (1)$$

In addition, the following equation can be formulated from static balance of forces in x and y directions:

$$-P_s - P\sin θ_2 - R_P\cos θ_2 + R_1\sin θ_1 - R_2\cos θ_1 = 0$$

$$P\cos θ_2 - R_P\sin θ_2 - R_1\cos θ_1 - R_2\sin θ = 0 \quad (2)$$

The equation (1) is substituted into the equation (2) to formulate the following equation:

$$R_1\sin θ_1 - R_2(\cos θ_1 + \cos θ_2) = P_s + P\sin θ_2$$

$$R_1\cos θ_1 + R_2(\sin θ_1 + \sin θ_2) = P\cos θ_2 \quad (3)$$

When it is assumed that the engagement piece 42 is subject to a load just enough to keep the engagement piece 42 from sliding, the following equation can be formulated:

$$R_2 = μR_1 \quad (4)$$

The equation (4) is substituted into the equation (3) to formulate the following equation:

$$R_1(\sin θ_1 - μ(\cos θ_1 + \cos θ_2)) = P_s + P\sin θ_2$$

$$R_1(\cos θ_1 + μ(\sin θ_1 + \sin θ_2)) = P\cos θ_2 \quad (5)$$

Each of the sides in the equation is divided to formulate the following equation:

$$\{\sin θ_1 - μ(\cos θ_1 + \cos θ_2)\}/\{\cos θ_1 + μ(\sin θ_1 + \sin θ_2)\} = (P_s + P\sin θ_2)/P\cos θ_2$$

For convenience's sake, the left side at which a constant is placed after determination of the structure will be designated as α:

$$\{\sin\theta_1 - \mu(\cos\theta_1 + \cos\theta_2)\}/\{\cos\theta_1 + \mu(\sin\theta_1 + \sin\theta_2)\} = \alpha$$

$$\alpha = (P_s + P\sin\theta_2)/P\cos\theta_2$$

P is solved to formulate the following equation:

$$P = P_s/(\alpha\cos\theta_2 - \sin\theta_2) \quad (6)$$

When three of the engagement pieces 42 concurrently bring into contact with the output rotator 20, the torque produced on the output rotator 20 by reactive force from the engagement pieces 42 can be expressed by the following equation:

$$T = 3L\mathrm{sqrt}(P^2 + R_P^2) \quad (7)$$

(where sqrt( ) denotes a square root).

Moment arm L can be expressed by the following equation:

$$L = L_{POFF}\sin\theta_{POFF} \quad (8)$$

Since $\theta_{POFF}$ takes a value obtained by adding the angle of resultant force of P and $R_P$ to the angle $\theta_2$ of the contact surface between the engagement piece 42 and the output rotator 20, the following equation can be formulated:

$$\theta_{POFF} = \theta_2 + \mathrm{Tan}^{-1}(R_P/P) \quad (9)$$

When it is assumed that the height from the x axis passing through the center O of the output rotator 20 to the contact point between the engagement piece 42 and the output rotator 20 is designated as h and the distance from the contact point between the engagement piece 42 and the output rotator 20 to the point of intersection between the normal to the contact point and the y axis is designated as r, the following equation can be formulated:

$$r\sin\theta_2 = (L_{POFF} + h)\tan\theta_{POFF}$$

$$h = r\cos\theta_2 - L_{OFF}$$

From the foregoing equation, the following equation will be obtained:

$$L_{POFF} = (r\sin\theta_2/\tan\theta_{POFF}) - r\cos\theta_2 + L_{OFF} \quad (10)$$

From the foregoing calculations, P, $R_1$, and $R_2$ can be determined by the use of the equations (6), (4), and (5), from the given $P_s$, the respective dimensions and angles of the structures, and the static friction coefficient μ. In addition, the maximum torque the engagement piece 42 can withstand can be calculated by the use of the equations (7) to (10).

Taking notice of the equation (6), as the denominator at the right side approaches zero, the load P just enough to keep the engagement piece 42 from sliding continuously becomes larger and eventually diverges in an infinite manner. That is, it can be said that the engagement piece 42 theoretically will not slide even with the maximum torque under a certain condition.

If the denominator at the right side in the equation (6) takes a positive value as described below, the engagement piece 42 start to slide under a finite load:

$$\alpha\cos\theta_2 - \sin\theta_2 > 0$$

Under the condition other than the foregoing one as described below, the engagement piece 42 does not start to slide under a finite load:

$$\alpha\cos\theta_2 - \sin\theta_2 \le 0$$

When α is returned to the original value, the following equation can be formulated:

$$\{\sin\theta_1 - \mu(\cos\theta_1 + \cos\theta_2)\}\cos\theta_2/\{\cos\theta_1 + \mu(\sin\theta_1 + \sin\theta_2)\} - \sin\theta_2 \le 0$$

The foregoing equation is solved to formulate the following equation:

$$\sin(\theta_1 - \theta_2)/\{\cos(\theta_1 - \theta_2) + 1\} \le \mu \quad (11)$$

By using a combination of $\theta_1$ and $\theta_2$ satisfying the condition in the equation (11), it is possible to design the fixed member 10, the engagement piece 42, and the output rotator 20 that do not slide even with the maximum torque. It is important to set $\theta_1$ and $\theta_2$ such that there is as a small difference in angle between them as possible.

Since $\theta_1 - \theta_2 = 0$, the following relationship holds:

$$\sin\theta(\cos\theta + 1) \le \mu \quad (11)$$

Thus, the example makes it possible to obtain favorable engagement and disengagement effects of the engagement pieces 41, 42 by setting the angle θ so as to meet the equation (11).

According to the structure of the thus configured clutch mechanism 1, the integral pressure transmission portions 31 are fitted into the single space inside and outside the recesses 22. In addition, the flat abutment surfaces 31a, 31b in the pressure transmission portions 31 abut sequentially against the pressed surfaces 22a, 22b and the engagement pieces 41, 42. Thus, the clutch mechanism 1 is simpler in structure as compared to the conventional art using separated members such as cylindrical portions, pins, and pin holes. This structure facilitates size reduction, achieves favorable productivity, causes less malfunction resulting from foreign matter, and enhances durability.

The cam surfaces 21, 23 are formed in an arc-shaped convex surface that has a radius larger than a value obtained by subtracting the diameter of the engagement pieces 41, 42 from the radius of the housing chamber inner circumferential surface 11a. Thus, the angle θ, which is formed by the tangent between the housing chamber inner circumferential surface 11a and the engagement pieces 41, 42, and the engagement pieces 41, 42 and the cam surfaces 21, 23, can be suitably set within a wider range as compared to the conventional art in which the cam surfaces are formed flat. Thus, for example, even if the engagement pieces 41, 42 are reduced in size by disposing the engagement pieces near the deeper sides of the wedge-shaped portions, it is possible to design the engagement pieces 41, 42 so as to be easily engaged in the wedge-shaped portions formed by the housing chamber inner circumferential surface 11a and the cam surfaces 21, 23, by setting the relatively large angle θ. This allows downsizing of the entire clutch mechanism 1 while maintaining the favorable engagement and disengagement effects of the engagement pieces 41, 42.

As for the downsizing, more specifically, the clutch mechanism 1 can be reduced in size down to an outer diameter of 12 mm or less that cannot be realized by the conventional configurations.

The biasing member 50 includes the fixing portion 51 retained at the output rotator 20 and the pressing portions 52, 52 that are extended and inclined in a Y shape from the fixing portion 51. The engagement pieces 41, 42 are pressed by the surfaces of the pressing portions 52 at the inclined sides. This makes a reactive force received at the biasing member 50 from the one engagement piece 41 (or 42) less prone to be transmitted to the other engagement piece 42 (or 41). Thus, the biasing member 50 can be prevented from being under action of an unintended force and maintain a stable biasing force of the pressing portions 52.

According to the clutch mechanism 1, even if the output rotator 20 is subject to an external rotational force in the one or the other direction (clockwise or counterclockwise direction), the output rotator 20 is restrained by the action of the engagement pieces 41, 42 and the like. As an alternative mode, the output rotator 20 may be restrained only when the output rotator 20 is subject to a rotational force in either the one or the other direction.

In this mode, the clutch mechanism 1 may be configured such that all of the one engagement pieces 41 are eliminated. According to this configuration, when the output rotator 20 is subject to a rotational force in the one direction (clockwise direction in FIG. 1), the respective engagement pieces 42 are pressed against the narrowed wedge-shaped portions between the housing chamber inner circumferential surface 11a and the cam surfaces 23. As a result, the rotation of the output rotator 20 can be blocked.

In addition, when the output rotator 20 is subject to a rotational force in the other direction (counterclockwise direction in FIG. 1), the respective engagement pieces 42 are separated from the wedge-shaped portions between the housing chamber inner circumferential surface 11a and the cam surfaces 23. This decreases friction between the engagement pieces 42 and the housing chamber inner circumferential surface 11a, and friction between the engagement pieces 42 and the cam surfaces 23. As a result, the output rotator 20 can be smoothly rotated.

Further, when the input rotator 30 is subject to a rotational force in the one direction, the pressure transmission portions 31 abut against the engagement pieces 42 and then press the pressed surfaces 22b of the recesses 22. Meanwhile, when the input rotator 30 is subject to a rotational force in the other direction, the pressure transmission portions 31 press the pressed surfaces 22a of the recesses 22 without abutting against any of the engagement pieces. Therefore, the rotational force of the input rotator 30 can be smoothly transmitted to the output rotator 20 in any of the rotational directions.

According to the configuration of the clutch mechanism 1, the output rotator 20 is rotatably supported with respect to the fixed member 10, and the input rotator 30 is rotatably supported with respect to the output rotator 20. This supporting structure is only needed to allow the output rotator 20 and the input rotator 30 to rotate bi-directionally. As an alternative, for example, the supporting structure may be configured to allow the output rotator 20 and the input rotator 30 to be rotatably supported by a single axial member.

According to the clutch mechanism 1, three sets of cam surface 21, 22, recess 22, engagement pieces 41, 42, biasing member 50 and the like are disposed. As an alternative example, two or more sets or four or more sets of these components may be provided at the outer circumferential portion of the output rotator 20.

LIST OF REFERENCE NUMERALS

1: Clutch mechanism
10: Fixed member
11: Housing chamber
11a: Inner circumferential surface of housing chamber
20: Output rotator
21, 23: Cam surface
22: Recess
22a, 22b: Pressed surface
30: Input rotator
31: Pressure transmission portion
31a, 31b: Abutment surface
41, 42: Engagement piece
50: Biasing member
51: Fixing portion
52: Pressing portion

The invention claimed is:

1. A clutch mechanism comprising:
a housing chamber having a cylindrical space;
an output rotator coaxially housed in the housing chamber;
an input rotator coaxially provided with the output rotator;
an engagement piece provided between an inner circumferential surface of the housing chamber and an outer circumferential surface of the output rotator; and
a biasing member configured to bias the engagement piece toward one side of a circumferential direction, wherein
the output rotator has on the outer circumferential surface thereof a cam surface configured to gradually reduce the space from the inner circumferential surface of the housing chamber toward the one side and a recess adjacent to the one side of the cam surface,
the input rotator has a pressure transmission portion fitted with circumferential play to the recess and is protruded from the inside of the recess in a centrifugal direction,
the engagement piece is disposed in contact with the cam surface and the inner circumferential surface of the housing chamber,
when the input rotator rotates toward the other side relative to the one side, the pressure transmission portion abuts against the engagement piece and then abuts against a circumferential end surface in the recess to press and move the output rotator,
the pressure transmission portion has a flat abutment surface radially extending from the inside to outside of the recess and configured to abut against both the circumferential end surface in the recess and the engagement piece, and
the biasing member includes a fixing portion inserted in a lock position formed in the output rotator and a pressing portion extended from the fixing portion and bent at an outside of the output rotator in a radial direction of the output shaft toward the one side of the circumferential direction and a radially outward direction to press the engagement piece.

2. The clutch mechanism according to claim 1, wherein the cam surface is formed as a convex surface curved in the circumferential direction.

3. The clutch mechanism according to claim 2, wherein the engagement piece is formed in a cylindrical or spherical shape, and
the cam surface is formed in an arc shape that has a radius larger than a value obtained by subtracting the diameter of the engagement piece from the radius of the inner circumferential surface of the housing chamber.

4. The clutch mechanism according to claim 3, wherein, when the angle formed by the tangent between the inner circumferential surface of the housing chamber and the engagement piece and the tangent between the engagement piece and the cam surface is designated as $\theta$ and either the coefficient of static friction between the inner circumferential surface of the housing chamber and the engagement piece or the coefficient of static friction between the engagement piece and the cam surface, which is smaller in value, is designated as $\mu$, the relationship $\sin\theta/(\cos\theta+1) \leq \mu$ holds.

5. The clutch mechanism according to claim 1, wherein
the engagement piece is provided in a pair,
the biasing member is provided to bias the pair of engagement pieces toward one side and the other side opposite to each other in the circumferential direction,
the cam surface includes a plurality of sets of one cam surface configured to gradually reduce the space from the inner circumferential surface of the housing chamber toward the one side and the other cam surface configured to gradually reduce the space from the inner circumferential surface of the housing chamber toward the other side, the plurality of sets being disposed in the circumferential direction,
the recess is adjacent to the one side of the one cam surface and adjacent to the other side of the other cam surface,
one of the pair of engagement pieces is disposed in contact with the one cam surface and the inner circumferential surface of the housing chamber, and the other is disposed in contact with the other cam surface and the inner circumferential surface of the housing chamber,
the pressure transmission portion is provided for each of the recesses,
when the input rotator rotates toward the other side, the pressure transmission portion abuts against the one engagement piece and then abuts against a circumferential end surface of the other side in the recess to press and move the output rotator toward the other side, and
when the input rotator rotates toward the one side, the pressure transmission portion abuts against the other engagement piece and then abuts against a circumferential end surface of the one side in the recess to press and move the output rotator toward the one side.

\* \* \* \* \*